US010383200B1

(12) United States Patent
Romano et al.

(10) Patent No.: US 10,383,200 B1
(45) Date of Patent: Aug. 13, 2019

(54) LIGHTING CONTROL SYSTEM CONFIGURABLE BY CONTROL DEVICE

(71) Applicant: Enlighted, Inc., Sunnyvale, CA (US)

(72) Inventors: John Romano, Sparta, NJ (US); David Perkins, San Carlos, CA (US); Reid Senescu, Portola Valley, CA (US); Jason Kurashige, San Mateo, CA (US); Wayne Ouchida, San Jose, CA (US); Tanuj Mohan, Mountain View, CA (US)

(73) Assignee: Enlighted, Inc., Sunnyvale, CA (US)

( * ) Notice: Subject to any disclaimer, the term of this patent is extended or adjusted under 35 U.S.C. 154(b) by 0 days.

(21) Appl. No.: 16/226,479

(22) Filed: Dec. 19, 2018

(51) Int. Cl.
| H05B 33/08 | (2006.01) |
| H05B 37/02 | (2006.01) |
| H04W 4/33 | (2018.01) |
| H04L 12/28 | (2006.01) |
| G06F 3/0484 | (2013.01) |

(52) U.S. Cl.
CPC ..... *H05B 37/0272* (2013.01); *H04L 12/2807* (2013.01); *H04W 4/33* (2018.02); *H05B 37/0227* (2013.01); *G06F 3/04847* (2013.01)

(58) Field of Classification Search
None
See application file for complete search history.

(56) References Cited

U.S. PATENT DOCUMENTS

| 9,192,019 | B2 | 11/2015 | Huizenga et al. |
| 9,549,451 | B2* | 1/2017 | Saes ................... H05B 37/0227 |
| 9,618,915 | B2 | 4/2017 | Mohan et al. |
| 9,888,548 | B2 | 2/2018 | Huizenga et al. |
| 10,111,308 | B2 | 10/2018 | Huizenga et al. |
| 2009/0236910 | A1 | 9/2009 | Yamada et al. |
| 2013/0181813 | A1* | 7/2013 | Norlen ................... G08C 19/16 340/9.1 |

* cited by examiner

Primary Examiner — Dedei K Hammond

(57) ABSTRACT

There is described a lighting control system of a building environment comprising a control device and a lighting device. The control device is capable of detecting an activation of a configuration mode of the lighting control system and controlling illumination for the building environment in response to command inputs received at a user interface. The lighting device is capable of receiving a message indicating that the activation of the configuration mode has been detected by the control device and receiving a directional signal from a directional device subsequent to receiving the message. A membership status of the lighting device in a device group is changed in response to receiving the directional signal.

20 Claims, 6 Drawing Sheets

LIGHTING CONTROL SYSTEM CONFIGURABLE BY CONTROL DEVICE

FIELD OF THE INVENTION

This application generally relates to the field of lighting control systems and, more particularly, systems and methods for configuring lighting control for a building environment.

BACKGROUND

Lighting control systems provide the capability of managing lighting devices for building environments. These lighting devices include lighting fixtures, switches, cables, and power sources. The lighting control systems provide operational benefits to building operators and occupants.

Lighting controls for building environments may be challenging to install and configure. In particular, an existing building environment may not have the necessary wiring in order to interconnect lighting devices, and installation of the necessary wiring may be difficult and expensive. For example, a switch for a lighting control system may provide additional functionality for controlling light fixtures and, as a result, require new or additional wiring to support these new functions. Thus, upgrading generally necessitates the removal of existing systems and installation of new hardware.

For existing building environments, wireless lighting systems may be advantageous over wired lighting systems for expanding components and upgrading capabilities. Even so, conventional wireless lighting systems have their limitations. Wireless systems typically have a local-based or cloud-based controlling device that communicates with lighting devices via wireless communications. These wireless systems require the purchase and installation of the controlling device, and they may also require purchase and installation of gateways and/or other components to communicate between devices. For other wireless lighting systems, a mobile device or tablet having wireless communication capabilities may download an application to configure and control various lighting devices of the system. However, installation and configuration of lighting devices for a wireless lighting system are challenging, particularly for complex functions such as grouping and synchronization of light devices coordinated use and monitoring.

SUMMARY

As described herein, there is provided a technique for configuring a lighting control system of a building environment. A control device communicates wirelessly with the lighting devices that control light fixtures. The lighting control system may be configured by operation of the control device in combination with a directional signal transmission to each lighting device. For example, lighting devices may be commissioned or decommissioned from a particular device group by flashing an amplified or oscillated light at a sensor of each lighting device. Also, the lighting devices include lighting behavior profile information and group information so that the lighting devices may be easily associated with each other as well as the control device.

One aspect is a lighting control system of a building environment comprising a control device and a lighting device. The control device includes a user interface to detect an activation of a configuration mode of the lighting control system. The control device is configured to control illumination for at least a portion of the building environment in response to a command input received at the user interface. The lighting device is configured to receive wirelessly a message indicating that the activation of the configuration mode has been detected by the control device. The lighting device is further configured to receive wirelessly a directional signal from a directional device subsequent to receiving the message. A membership status of the lighting device in a device group is changed in response to receiving the directional signal.

Another aspect is a method for configuring the lighting control system of the building environment. The user interface of the control device detects an activation of a configuration mode of the lighting control system. The lighting device receives wirelessly a message indicating that the activation of the configuration mode has been detected by the control device. The lighting device receives wirelessly a directional signal from the directional device subsequent to receiving the message. A membership status of the lighting device in a device group in response to receiving the directional signal. The control device controls remotely the lighting device in response to detecting a command input at the user interface of the control device.

Yet another aspect is the lighting device for configuring the lighting control system of the building environment. A communication component of the lighting device is configured to receive wirelessly a message indicating that an activation of a configuration mode has been detected by a first remote device. A sensor component of the lighting device is configured to receive wirelessly a directional signal from a second remote device subsequent to receiving the message. A controller of the lighting device is configured to change a membership status of the lighting device in a device group in response to receiving the directional signal.

The above described features and advantages, as well as others, will become more readily apparent to those of ordinary skill in the art by reference to the following detailed description and accompanying drawings. While it would be desirable to provide one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects.

DETAILED DESCRIPTION

To facilitate an understanding of embodiments, principles, and features of the present invention, they are explained hereinafter with reference to implementation in illustrative embodiments. In particular, they are described in the context of a system and method for configuring lighting control for a building environment. Embodiments of the present invention, however, are not limited to use in the described systems, devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

The lighting control system of the building environment may be configured to maximize building management performance with regard to occupant comfort, energy usage, and/or visual aesthetics. Although the lighting control system may operate in coordination with a larger lighting network of multiple environments, the lighting control system described herein is capable of operating independent of any external management devices/servers and their associated gateways. For example, the lighting control system may operate with a control device, a direction device (such as a light or laser pointer), and a lighting device corresponding to each light fixture in the building environment. The lighting control system may be configured by operation of the control device in combination with a directional signal transmission to each lighting device.

Figure 1:
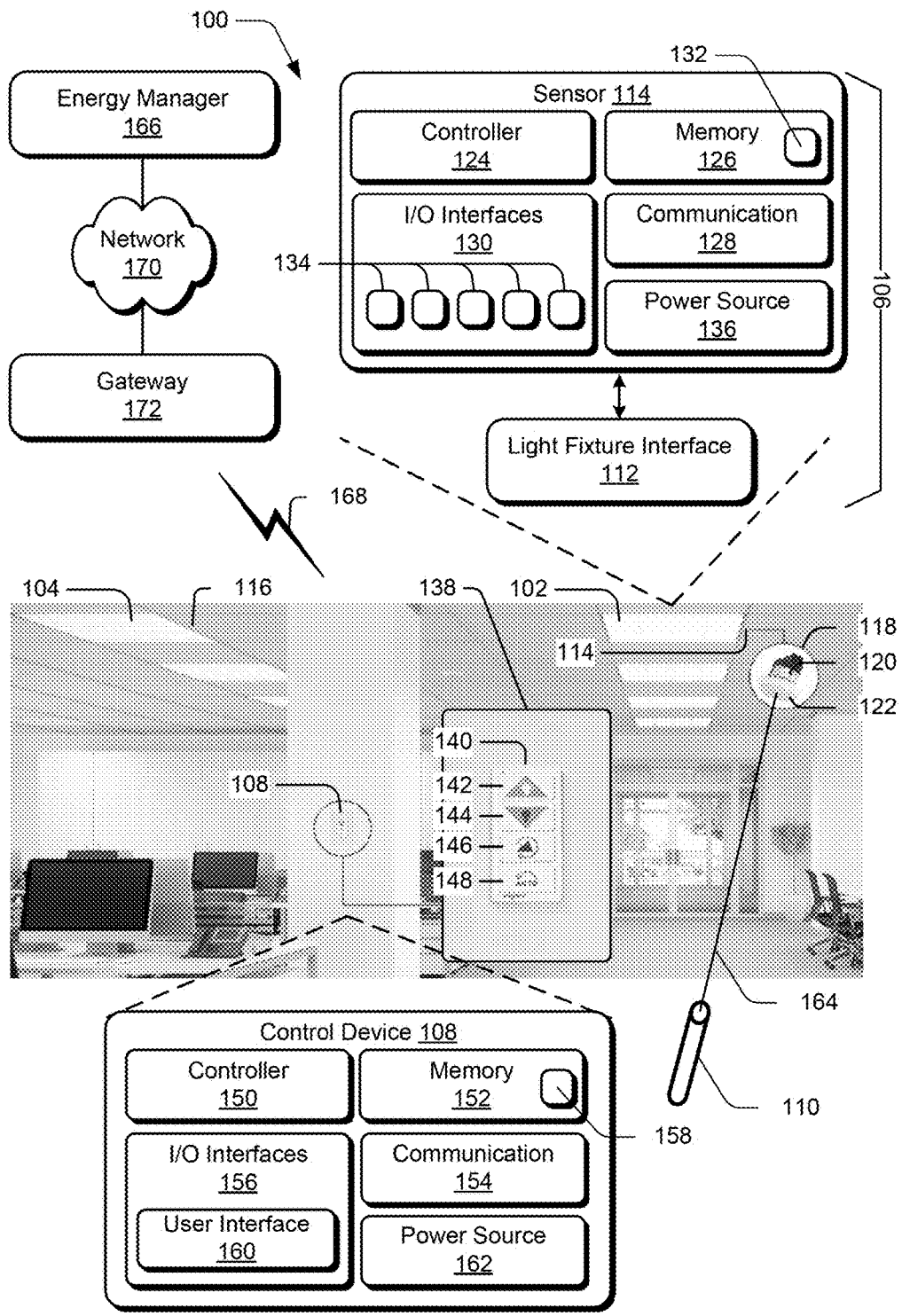
FIG. 1 is an illustration of a building environment in an example implementation that may be operable to employ techniques described herein.

FIG. 1 is an illustration of a building environment in an example implementation of the lighting control system 100. The lighting control system 100 includes multiple light fixtures 102, 104 located throughout the building environment to provide illumination, a lighting device 106 corresponding to each light fixture, a control device 108 located remote from the lighting device within the building environment, and a directional device 110 having the capability of being positioned in proximity to the lighting device. Each control device 108 may be associated with a device group that identifies any lighting devices 106 that may be controlled by the control device. The device group might not include any lighting devices 106, such as a situation where the control device 108 is initially installed at a building environment, the device group might include all lighting devices within communication proximity of the control device, or the device group might include some lighting devices but not others. For example, the device group of a particular control device 108 may include some lighting devices 106 within communication proximity of the control device but not other lighting devices within communication proximity of the control device. For other embodiments, a building environment may include multiple control devices 108 in which a first device group of a first control device may include some lighting devices 106 within communication proximity of the first control device and a second device group of a second control device may include other lighting devices within communication proximity of the second control device.

Each lighting device 106 may include a light fixture interface 112 and a smart sensor 114. Similar to the lighting fixtures 102, 104, multiple smart sensors 114, 116 may be situation throughout a building environment, in which each smart sensor corresponds to a particular lighting fixture. The light fixture interface 112 of the lighting device 106 connects with a light fixture corresponding to the lighting device to control the power flowing through the light fixture. The light fixture interface 112 also connects with the smart sensor 114 to receive information from the smart sensor utilized to control the light fixture and transmit information to the smart sensor for forwarding to other components of the lighting control system 100. For example, the light fixture interface 112 may include a powerpack component for interconnection between a ballast of the light fixture and a power source as well as a wired connection to the smart sensor 114. For another example, the powerpack component of the light fixture interface 112 may interconnect between a driver, such as an LED (light-emitting diode) or fluorescent driver, and the power source as well as the wired connection to the smart sensor 114. For these examples, the powerpack component may provide dimming and on/off control signaling to the ballast or driver to control one or more lamps connected to the ballast or driver.

The smart sensor 114 of each lighting device 106 includes sufficient electronic intelligence to control the corresponding light fixture 102 directly and, if desired, other building management functions such as, but not limited to, beaconing, indoor location determination, and real estate utilization analytics. Smart sensors 114 may provide information to other devices of the lighting control system 100 facilitate adjustments to light levels based on occupancy, task tuning, daylight harvesting, and configurable lighting profiles for rooms, open spaces, hallways, and the like. As stated above, the smart sensor 114 is connected to the light fixture interface 112 for the purposes of transmitting information to the light fixture interface for controlling the corresponding light fixture and receiving information from the light fixture interface for forwarding to other components of the lighting control system 100. As shown in FIG. 1, an enlarged view 118 of the smart sensor 114 illustrates a smart sensor body 120 and a sensor surface 122 positioned at one end of the smart sensor body, in which the smart sensor may be installed at a structural support of the building environment. For example, the smart sensor body 120 may be embedded at a building surface (e.g., ceiling or wall) while the sensor surface 122 may be exposed, or partially exposed, at the building surface. By positioning the sensor surface 122 at a more exposed position in the building environment relative to the remainder of the lighting device 106, sensor components of the smart sensor 114 are positioned for optimal reception of wireless (e.g., light, radio frequency, and the like) signals from other devices positioned in the building environment.

Referring still to FIG. 1, there is shown a block diagram of example components of the smart sensor 114 of each lighting device 106. The smart sensor 114 includes one or more controllers 124, one or more memory components 126, one or more communication components 128, and input/output (I/O) interfaces 130. The communication component 128 of the example components may utilize various forms of wireless technology for communication, including light-based technology (such as infrared and ultraviolet), ionizing radiation-based technology (such as gamma rays and x-rays), microwave-based technology, radio wave-based technology, and audio-based technology. For example, one form of light-based technology is an amplified or oscillated light signal based on visible light, such as a green laser having a classification of Class 2 or higher. Examples of radio wave-based technology include, but are not limited to, IEEE 802.11 (Wi-Fi), IEEE 802.16 (WiMAX), and IEEE 802.15 (WPAN) including Bluetooth®, BLE, and ZigBee (The "Bluetooth" word mark and logos are registered trademarks owned by Bluetooth SIG, Inc.). The communication component 128 may also utilize wired technology for communication, in addition to or in the alternative to wireless communications, which may include any type of transmission of data over a physical conduit, such as an electrical cable or optical fiber cable. For example, communications intended for the light fixture interface 112 may be received wirelessly by the smart sensor 114 (particularly the communication component 128) and transferred to the light fixture interface via a wired conduit between the smart sensor and the light fixture interface. Likewise, communications to be sent by the light fixture interface 112 may be transferred to the smart sensor 114 via a wired conduit and transmitted wirelessly by the smart sensor 114 (particularly the communication component 128) to other devices within communication range.

The controller 124 may execute code and process data 132 received from other components of the device, such as information received at the communication component 128 or stored at the memory component 126. The code associated with the lighting control system 100 and stored by the memory component 126 may include, but is not limited to, operating systems, sensor control applications, device drivers, and the like. The data 132 associated with the lighting control system 100 and stored by the memory component 126 may include, but is not limited to, device groups, device profiles, environment profiles, incoming messages, outgoing messages, communication protocols, and the like.

For some embodiments, most or all necessary information for management of the lighting control system 100 may be stored at the memory component 126 of a lighting device 106. For these embodiments, one advantage is that a control device 108 may be easily added to, or replaced in, the device group of the building environment with minimal configuration. Another advantage is that lighting devices 106 may be easily added or replaced as well. Behavior and group information may be transferred from a lighting device 106 to a new device to facilitate and expedite the configuration process for the new device. Further, regarding these particular embodiments, the control device 108 is needed for configuration of the lighting control system 100 but is no longer needed after configuration. In particular, a single control device 108 may be used program multiple devices and/or multiple device groups. Once configured, the lighting devices 106 may behave as a group and operate autonomously from the control device 108.

The components of each sensor 114 may further comprise one or more input/output (I/O) interfaces 130. The I/O interfaces 130 may include various types of sensor components 134, such as light sensors, motion sensors, temperature sensors, imaging sensors, and air quality sensors. For example, the sensor components 134 may include a photo-sensors such as light pipe/photosensor array and/or a motion sensor such as digital passive infrared (IR) sensor. Likewise, the I/O interfaces 130 may include other component associated with video, audio and/or mechanical inputs and outputs.

The components of each smart sensor 114 may further comprise a power source 136, such as an independent power source or a power supply coupled to main power of a building available in the building environment. The power source 136 may also provide power to the other device components of each smart sensor 114 of the building management system 100.

As stated above, the lighting control system 100 includes a control device 108 located remote from the lighting device 106 within the building environment. The control device 108 may be positioned anywhere within communication proximity to the lighting devices 106 to be controlled by the control device. For example, the control device 108 may be mounted to a fixed structure (such as a wall or column) of the building environment. The control device 108 communicates wirelessly with the lighting devices 106 that manage illumination for the building environment and communicate with other smart sensor devices.

FIG. 1 provides an enlarged view 138 of the control device 108 to illustrate a control panel 140 and multiple control buttons 142-148 positioned at, and supported by, the control panel. The control panel 14 is, in turn, supported by a structural support (such as a wall or column) of the building environment. The control device 108 may be mounted directly to the structural support or attached to a gang box embedded in the structural support and, optionally, a face plate may be attached to the front of the control device. The multiple control buttons 142-148 exposed at the front of the control device 108 may be used individually to perform various functions of the lighting control system 100. For example, a first button 142 may be selected momentarily to activate illumination at a group of light fixtures (identifying by the associated device group), and selected for an extended period to gradually brighten illumination for the same. Conversely, a second button 144 may be selected momentarily to deactivate illumination at the group of light fixtures and selected for an extended period to gradually dim illumination for the same. Also, for this example, a third button 146 may be selected to cycle through different preset light levels of the group of light fixtures, and a fourth button 148 may be selected to reset lights to behave automatically.

The multiple control buttons 142-148 of the control device 108 may be used in conjunction with each other to perform other functions of the lighting control system 100. For example, selection of the first and third buttons 142, 146 at about the same time may result it activating a configuration mode to configure the lighting control system 100, and selection of the first and fourth buttons 142, 148 at about the same time may result in completion of the configuration mode to apply the selected configuration. Likewise, selection of the second and third buttons 144, 146 at about the same time may result it associating a control device 108 with a particular device group of the lighting control system 100, and selection of the third and fourth buttons 146, 148 at about the same time may result in disassociating lighting devices 106 from a control device 108 and/or ungrouping the lighting devices from each other.

Referring again to FIG. 1, there is shown a block diagram of example components of the control device 108. The control device 108 includes one or more controllers 150, one or more memory components 152, one or more communication components 154, and input/output (I/O) interfaces 156. The communication component 154 of the example components may utilize various forms of wireless technology for commutation, including light-based technology (such as infrared and ultraviolet), ionizing radiation-based technology (such as gamma rays and x-rays), microwave-based technology, radio wave-based technology, and audio-based technology. Examples of radio wave-based technology include, but are not limited to, IEEE 802.11 (Wi-Fi), IEEE 802.16 (WiMAX), and IEEE 802.15 (WPAN) including Bluetooth, Bluetooth Low Energy (BLE), and ZigBee. For example, one form of wireless technology is a Bluetooth 4.0 Low Energy in accordance with IEEE 802.15.4 having a radio frequency of about 2400 to 2483.5 MHz and an approximate range of 75 feet (23 meters) radius open range, capable of communicating with the lighting device 106, specifically the communication component 128 of the smart sensor 114. The communication component 154 may also utilize wired technology for communication, in addition to or in the alternative to wireless communications, which may include any type of transmission of data over a physical conduit, such as an electrical cable or optical fiber cable.

The controller 150 of the control device 108 may execute code and process data 158 received from other components of the control device, such as information received at the communication component 154 or stored at the memory component 152. The code associated with the control device 108 and stored by the memory component 152 may include, but is not limited to, operating systems, light control applications, device drivers, and the like. The data 158 associated with the lighting control system 100 and stored by the memory component 152 may include, but is not limited to, device groups, device profiles, environment profiles, incoming messages, outgoing messages, communication protocols, and the like.

The components of the control device 108 may further comprise one or more input/output (I/O) interfaces 156. The I/O interfaces 156 may include a user interface 160 having input components and/or output components. For example, the user interface 160 may include the control panel 140 and the multiple control buttons 142-148 positioned at, and supported by, the control panel, as represented by the enlarged view 138 of the control device 108 and described above. Likewise, the 1/O interfaces 130 may include other component associated with video, audio and/or mechanical inputs and outputs.

The components of the control device 108 may further comprise a power source 162, such as an independent power source or a power supply, similar to the power source 136 of the lighting device 106. For some embodiments, the power source 162 of the control device 108 may be a portable battery to allow positioning of the control device within the building environment without regard to the location of any electrical conduit. The power source 162 may also provide power to the other device components of the control device 108.

The lighting control system 100 further includes a directional device 110 having the capability of being positioned in proximity to the lighting device 106. The lighting devices 106 may be easily added to a building environment, such as a room, by simply directing or pointing a directional device 110 toward the smart sensor 114 of the lighting device. In particular, the control device 108 may detect an activation of a configuration mode of the lighting control system, and the lighting device 106 may receive a message from the control device indicating that the activation of the configuration mode has been detected. Subsequent to receiving the message from the control device 108, the lighting device 106 may receive a directional signal 164 from the directional device 110 at the sensor surface 122 of the smart sensor 114. In response to receiving the directional signal 164, the lighting device 106 and/or control device 108 may change a membership status of the lighting device in a device group.

Any type of directional device 110 may be used so long as the receiving lighting device 106 has a sensor 114 that may receive and recognize the signal provided by the directional device. Examples of directional devices include, but are not limited to, dedicated devices or mobile devices that utilize wireless technology for communication, including light-based technology (such as infrared and ultraviolet), ionizing radiation-based technology (such as gamma rays and x-rays), microwave-based technology, radio wave-based technology, and audio-based technology. For example, one form of dedicated device 110 is a laser pointer that generates an amplified or oscillated light signal based on visible light, such as a green laser having a classification of Class 2 or higher. As another example, the directional device 110 may be a flashlight, infrared controller, sound generating device, or some other device that may be used to group lighting devices 106. It should be noted that, although not required, there are cost and efficiency advantages to utilizing a directional device 110 that generates a signal that may be recognized by one or more sensor components 134 of the sensor 114 used for another purpose. For example, a lighting device 106 would not need a sensor component 134 dedicated to recognizing a signal provided by a directional device 110 if one of the existing sensor components of the lighting device used for detecting light levels may detect the signal from the direction device as well.

Although not required, an energy manager 166 may be added to the lighting control system 100. The energy manager 166 may communicate with the lighting control system 100 by one or more communication links 168 that utilized wired and/or wireless technologies. The energy manager 166 may be an on-premise server communicating directly, or a remote service communicating via a cloud or network 170, with the lighting control system 100. For some embodiments, the energy manager 166 may communicate with devices of the lighting control system 100 through one or more gateways 172 located in the building environment. Also, one or more devices of the lighting control system, such as a lighting device 106, may operate as the energy manager 166 for managing other devices of the building environment. The energy manager 166 may provide various functions and services for the lighting control system 100, such as upgrading the capabilities of the lighting device 106, such as updating lighting or IoT applications, adding licenses, and providing access to remote users.

Figure 2:
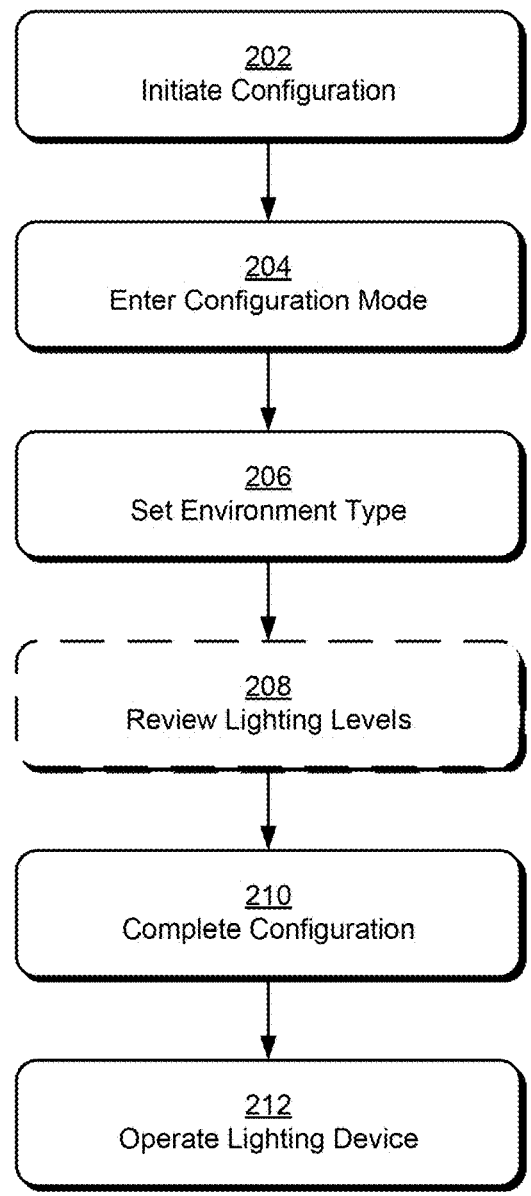
FIG. 2 is a flow diagram depicting an example implementation of an operational procedure that may employ techniques described herein.

Referring to FIG. 2, there is shown a flow diagram depicting an example implementation of an operational procedure 200 that may employ techniques of a control device 108 for controlling a lighting control system 100 of a building environment. The control device 108 initiates preliminary operations to promote smooth operation and detect whether a configuration mode is initiated, as represented by step 202. If the control device 108 detects initiation of the configuration mode, then the control device enters the configuration mode and preforms the various functions associated with the configuration mode, as represented by step 204. The control device 108 also performs functions to further program the control device 108 and/or lighting devices 106, such as setting an environment type for the lighting devices, as represented by step 206. The control device 108 may further perform functions that assist a user to fine-tune the configuration of the lighting control system 100, such as reviewing lighting levels of the lighting devices 106, as represented by step 208. After all selections for configuring the lighting control system 100 are completed, the control device 108 may implement the selected configuration settings, as represented by step 210. Thereafter, the control device 108 may performs non-configuration operations, such as operating the light fixtures via the lighting device 106, as represented by step 212. For example, the control device 108 may control remotely a light level of the lighting device in response to detecting a command input at the user interface 160 of the control device.

Figure 3:
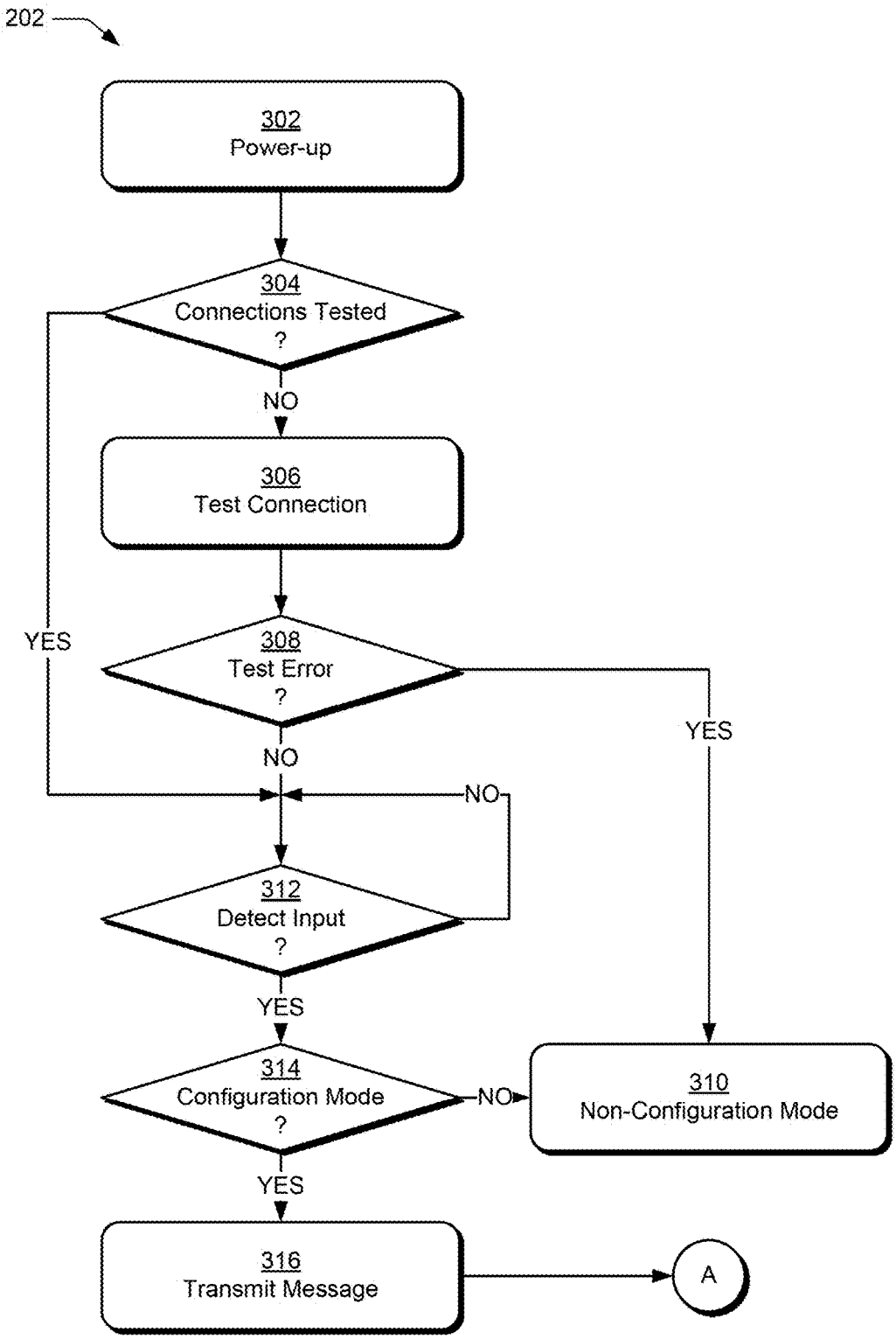
FIG. 3 is a flow diagram depicting an example implementation of the preliminary operations of FIG. 2.

Referring to FIG. 3, an example implementation depicting the preliminary operations 202 of the operational procedure 200 is shown in more detail. The preliminary operations 202 of the operational procedure may performed by the control device 108. The control device 108 may be activated or power-up, as represented by step 302. In response to activation, the control device 108 may perform wiring tests to detect and promote proper operation, as represented by steps 304, 306, & 308. For example, the control device 106 may determine whether wiring tests have been performed a predetermined number of times (such as 5 times) for the control device on previous occasions in response to power-up, as represented by step 304. If the number of wiring tests previously performed is less than the predetermined number, then the control device 108 performs the wiring test, as represented by step 306, and determines whether any errors result from the wiring test, as represented by step 308. If one or more errors are detected, then the control device 108 may exit the configuration mode and perform some other function, as represented by step 310. If the number of wiring tests previously performed is equal to (or possibly greater than) the predetermined number, then the control device 106 bypasses the wiring test and awaits a user input at the user interface 160 of the control device, as represented by step 312. Likewise, if no errors are detected as result of the wiring test, then the control device 108 proceeds to wait for a user input at the user interface 160 of the control device, as represented again by step 312.

Figure 4:
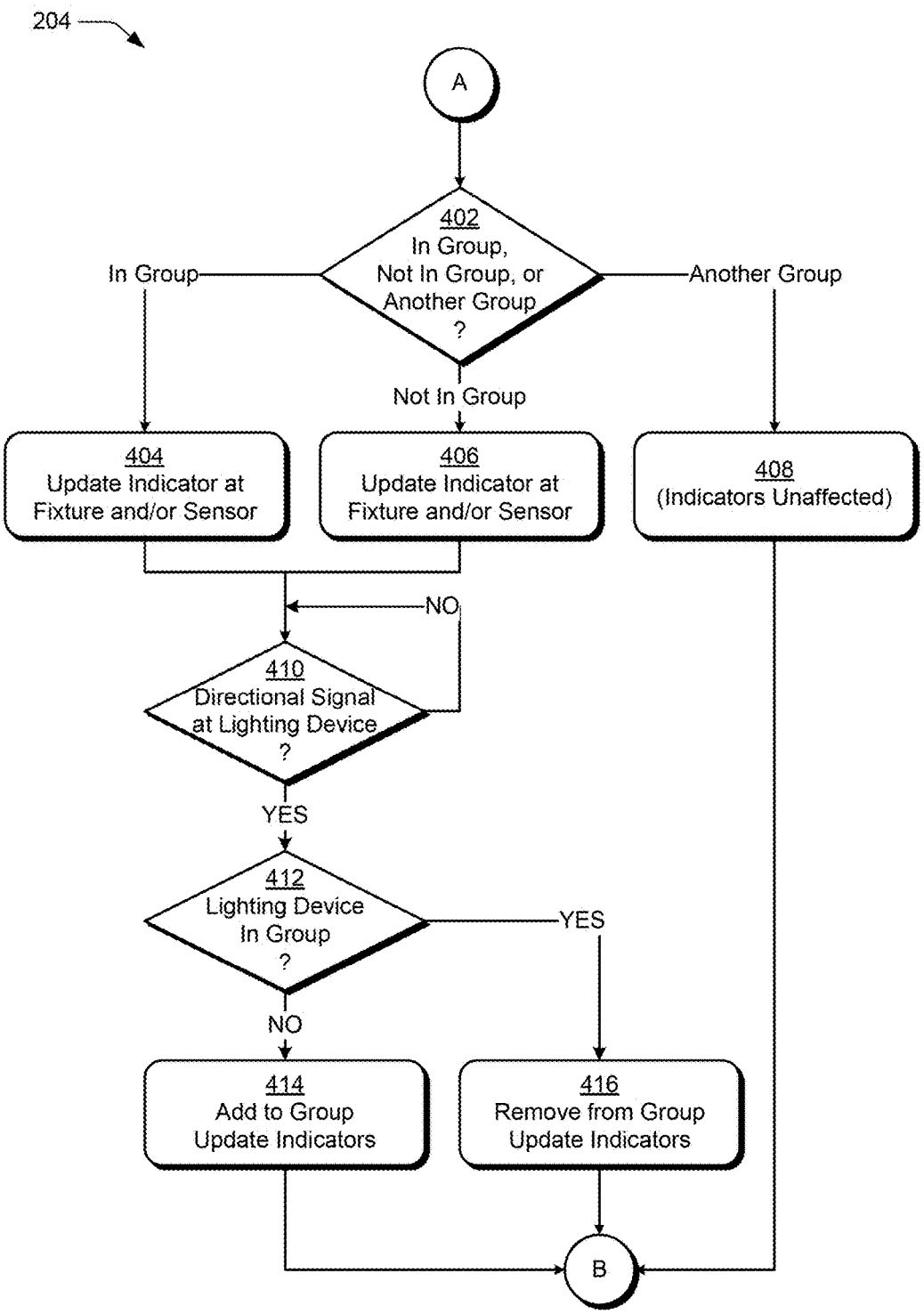
FIG. 4 is a flow diagram depicting an example implementation of the configuration mode sub-procedure of FIG. 2.

If a user input is detected at the user interface 160 of the control device 108, then the control device determines whether the user input corresponds to an activation of the configuration mode of the lighting control system 100, as represented by step 314. For example, a selection of a certain button or a certain combination of buttons at the user interface 160 may indicate an activation of the configuration mode. In such case, the control device 108 may proceed with entering the configuration mode 204, as represented by FIGS. 2 and 4. Otherwise, if the user input does not correspond to an activation of the configuration mode, then the control device 108 may exit the configuration mode and perform some other function, as represented by step 310. The control device 108 may send, and one or more lighting devices 106 may receive, wirelessly a message indicating that the activation of the configuration mode has been detected by the control device, as represented by step 316.

Referring to FIG. 4, an example implementation depicting the configuration mode sub-procedure 204 of the operational procedure is shown in more detail. It is to be noted that the configuration mode sub-procedure 204 of the operational procedure may performed by the lighting devices 106, the control device 108, or coordination of multiple devices. Upon entering the configuration mode, or at some point before entering the configuration mode, the lighting device 106 and/or the control device 108 may be associated with a device group that identifies any lighting devices that may be controlled by the control device. For the device group associated with a particular control device 108, the device group may include no lighting device, some lighting devices, or all lighting devices within communication proximity of the control device. For each lighting device 106, the lighting device 106 and/or the control device 108 identifies whether the lighting device is in the device group, in a different device group, or not in any device group, as represented by step 402. For any lighting device 106 identified as being in the device group, the light fixture and/or sensor 114 associated with the lighting device may provide a first indicator (e.g., visual or audio), as represented by step 404. For example, the first indicator may be bright illumination by the light fixture and/or inactivation of an LED of the sensor 114. For any lighting device 106 identified as not being in any device group, the light fixture and/or sensor 114 associated with the lighting device may provide a second indicator (e.g., visual or audio) that is different from the first indicator, as represented by step 406. For example, the second indicator may be dim illumination by the light fixture and/or illumination of a specific color of an LED of the sensor 114. For any lighting device 106 identified as being in a different device group, the light fixture and/or sensor 114 associated with the lighting device may not change its visual or audio indicator as a result of this determination, as represented by step 408, and proceed to the environment type sub-procedure 206 of FIG. 5. In the alternative, any light fixture and/or sensor 114 associated with a lighting device 106 identified as being in a different device group may provide a third indicator (e.g., visual or audio) that is different from the first and second indicators.

The lighting devices 106 and the control device 108 may utilize device groups to facilitate communications and management of the lighting devices with the control device as well as intercommunications among the lighting devices. As described herein, the control device 108 may control remotely the lighting device 106 in response to detecting a command input from the user interface 160 of the control device. One or more lighting devices 106 may also react to information or instructions received from one of the other lighting devices of the device group. For example, some or all members of a device group may response to a message received from a particular member (i.e., lighting device) of the device group indicating that motion has been sensed by the particular member.

A lighting device 106 may be identified as a member of the device group or not being a member of any device group, as represented by steps 404, 406. After identifying these lighting devices 106 and subsequent to receiving notification about the activation of the configuration mode, the lighting device 106 awaits a wireless directional signal from a directional device, as represented by step 410. For example, the lighting device 106 may receive the directional signal in the form of an amplified or oscillated light signal from a laser pointer. The lighting device 106 or the control device 108 may change a membership status of the lighting device in a device group in response to receiving the directional signal, as represented by steps 412, 414, & 416. Specifically, in response to receiving the directional signal from the directional device 110, the lighting device 106 or control device 108 may determine whether the lighting device is a member of the device group, as represented by step 412. If the lighting device 106 is not a member of the device group, then the lighting device or the control device adds the lighting device to the device group, as represented by step 414. If the lighting device 106 is a member of the device group, then the lighting device or the control device removes the lighting device from the device group, as represented by step 416. Thereafter, whether the lighting device 106 is added to or removed from the device group, the control device 108 proceeds to the environment type sub-procedure 206 of FIG. 5.

It is to be understood that multiple control device 108 may be associated with, and control, a device group and the lighting devices 106 of the device group. Similarly, a single control device 108 may be associated with, and control, multiple device groups and the lightings devices 106 of the device groups. The lighting control system 100 is further capable of coordinating multiple control devices 108 associated with, and controlling, multiple device groups and the lighting devices 106 of the device groups.

For some embodiments, the lighting device 106 may change the membership status of the lighting device in the device group if, before receiving the directional signal, the last or most recent message received by the lighting device 106 from the control device 108 indicates the activation of the configuration mode. If the lighting device 106 adds itself to a device group that does not exist (such as, a situation where the lighting device is the first one to be added to a particular device group), then the lighting device may send a message to the control device 108 advising the control device about a membership status of the control device in the device group and/or a different device group. Similarly, before receiving the directional signal, if the last or most recent message received by the lighting device 106 from the control device 108 includes a request to add the control device to the device group, then the lighting device may send a message to the control device advising the control device about a membership status of the control device in the device group and/or a different device group. Once the control device 108 know its membership status relative to the device group (i.e., knows to which group the control device belongs), then one or more subsequent messages from the control device may include information associated with the device group.

Figure 5:
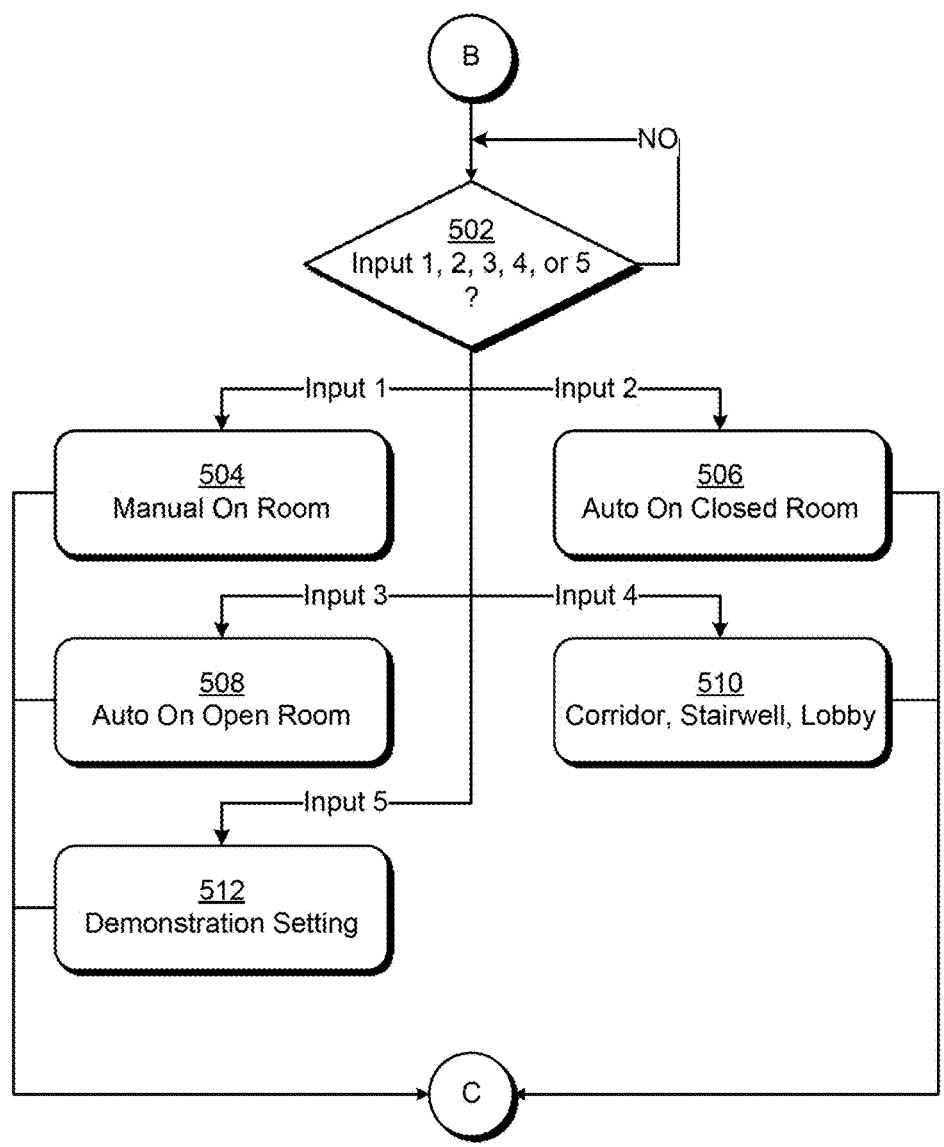
FIG. 5 is a flow diagram depicting an example implementation of the environment type sub-procedure of FIG. 2.

Referring to FIG. 5, an example implementation depicting the environment type sub-procedure 206 of the operational procedure 200 is shown in more detail. The environment type sub-procedure 206 of the operational procedure may be performed by the control device 108. Each lighting device 106 may have multiple different environment types, so that a particular device group may be assigned and further configured based on a selected environment type. Environment types may be selected by a user at the user interface 160 of the control device 108, as represented by step 502. Each input may correspond to a different selection or combination of selections at the user interface 160 of the control device 108. For example, as shown in FIG. 5, selection of Input 1 associates an environment type of Manual On Room 504 to the device group, Input 2 associates an environment type of Auto On Closed Room 506 to the device group, Input 3 associates an environment type of Auto On Open Room 508 to the device group, Input 4 associates an environment type of Corridor/Stairwell/Lobby 510 to the device group, and Input 5 associates an environment type of demonstration setting 512 to the device group. After selecting an environment type, the control device 108 may proceed with completing configuration and/or operating the lighting device.

Each environment type has an associated behavior based on the smart sensor type and/or building environment. The room parameters for the various environment types are similar, but each environment type includes one or more room parameters that distinguish it from the other environment types. For example, the Manual On Room 504 requires manual activation of lighting, whereas the Auto On Closed Room 506 provides automatic activation of lighting. As another example, the Auto On Open Room 508 is similar to the Auto On Closed Room 506, except that a light fixture for an open room may be set at a dimmed level for a longer period of time than a closed room just before minimizing the light level due to lack of occupancy. As a further example, the Corridor/Stairwell/Lobby 510 may have a minimum light level that is greater than one or more of the other types, while having a shorter initial switch timeout and no dimming and/or lingering operation before minimizing the light level. The demonstration setting 512 distinguishes from other types by having a much shorter time period for one or more timeout operations to facilitate demonstration of the system. In addition, a default type may also be used to provide room parameters that may accommodate a wide variety of environments.

Figure 6:
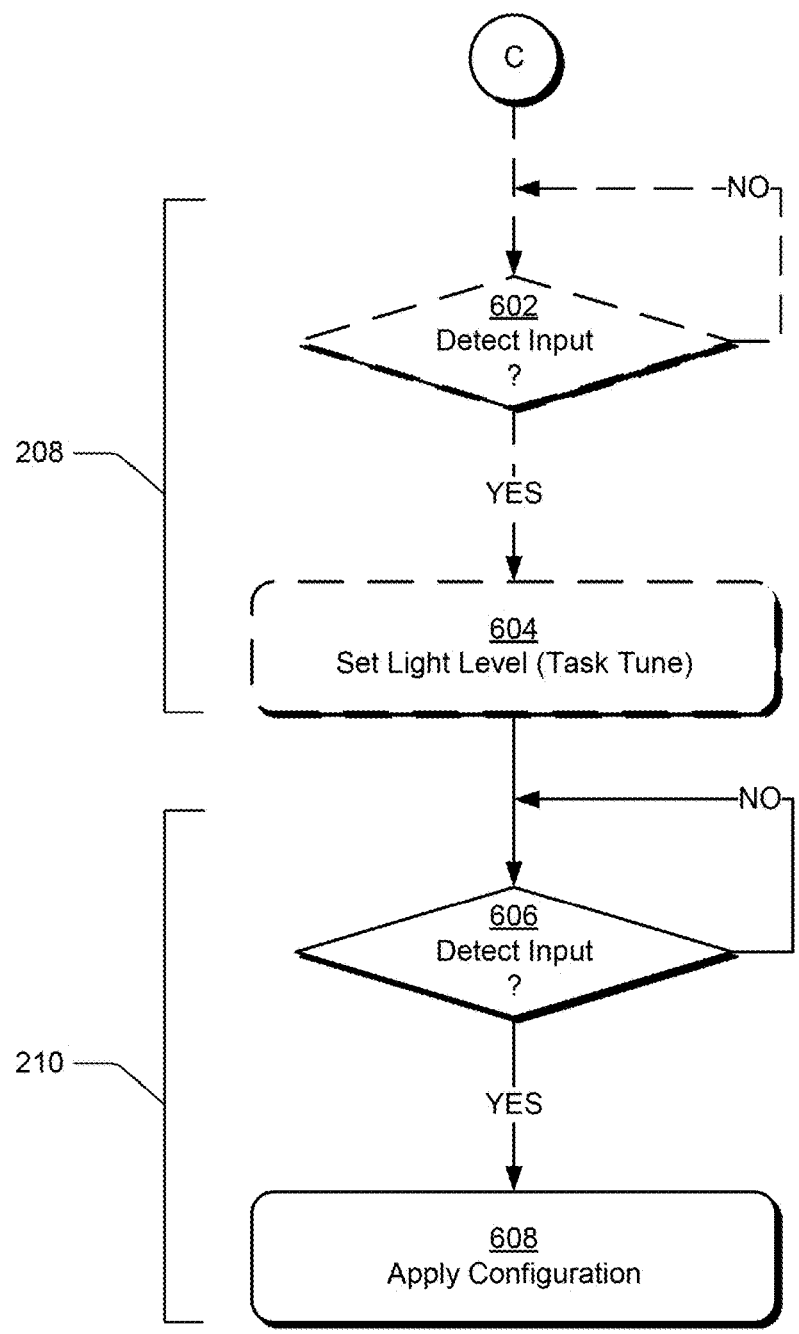
FIG. 6 is a flow diagram depicting an example implementation of the light level and configuration completion sub-procedures of FIG. 2.

Referring to FIG. 6, example implementations depicting the light level sub-procedure 208 and the configuration completion sub-procedure 210 of the operational procedure 200 are shown in more detail. The lighting control system 100 completes the configuration mode as represented by step 210 and, optionally, the lighting control system may configure different profiles and adjust task tune levels for each device group to optimize occupant comfort and energy efficiency for the corresponding building environment. The light level sub-procedure 208 of the operational procedure may performed by the control device 108, and the configuration completion sub-procedure 210 of the operational procedure may performed by the lighting devices 106, the control device 108, or coordination of multiple devices.

For the light level sub-procedure 208, the control device 108 may cycle through different preset light levels of the group of light fixtures in response to selections made at the user interface 160 of the control device. In particular, a user selection may be detected at the user interface 160 as represented by step 602. If a user selection is detected, then the light level of the lighting device 106 of the device group is adjusted. The light level of the device group may be further adjusted in response to further user selections detected at the user interface 160.

Once the desired light level is selected, as represented by step 604, the lighting control system 100 may proceed with the configuration completion sub-procedure 210 where the lighting devices 106 and/or the control device 108 may await a user selection, such as the user interface 160 of the control device, as represented by step 606. The lighting devices 106 and/or the control device 108 may apply the configuration set by the configuration mode sub-procedure 204 and the environment type sub-procedure 206, and optionally the environment type sub-procedure 208, in response to receiving the user selection at the user interface 160 for the configuration completion sub-procedure 210. Thereafter, the control device 108 may performs other operations, such as operating the light fixtures via the lighting device 106, as represented by step 212.

Those skilled in the art will recognize that, for simplicity and clarity, the full structure and operation of all data processing systems suitable for use with the present disclosure are not being depicted or described herein. Also, none of the various features or processes described herein should be considered essential to any or all embodiments, except as described herein. Various features may be omitted or duplicated in various embodiments. Various processes described may be omitted, repeated, performed sequentially, concurrently, or in a different order. Various features and processes described herein can be combined in still other embodiments as may be described in the claims.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an example embodiment of the present disclosure has been described in detail, those skilled in the art will understand that various changes, substitutions, variations, and improvements disclosed herein may be made without departing from the spirit and scope of the disclosure in its broadest form.

What is claimed is:

1. A lighting control system of a building environment comprising:
   a control device including a user interface to detect an activation of a configuration mode of the lighting control system, the control device being configured to control illumination for at least a portion of the building environment in response to a command input received at the user interface; and
   a lighting device configured to receive wirelessly a message indicating that the activation of the configuration mode has been detected by the control device, the lighting device being further configured to receive wirelessly a directional signal from a directional device subsequent to receiving the message,
   wherein a membership status of the lighting device in a device group is changed in response to receiving the directional signal.

2. The system as described in claim 1, wherein the control device is a switch configured to control remotely a light level of the lighting device.

3. The system as described in claim 1, wherein the lighting device comprises a light fixture interface and a sensor communicating with the light fixture interface, the light fixture interface being coupled to a light fixture that is configured to provide illumination to the at least a portion of the building environment.

4. The system as described in claim 1, wherein the lighting device comprises a light fixture configured to provide illumination to the at least a portion of the building environment and a sensor communicating with the light fixture.

5. The system as described in claim 1, wherein the directional signal is an amplified or oscillated light signal directed toward a sensor of the lighting device.

6. The system as described in claim 1, wherein one of either the lighting device or the control device adds the lighting device to the device group in response to determining that the lighting device is not a member of the device group.

7. The system as described in claim 1, wherein one of either the lighting device or the control device removes the lighting device from the device group in response to determining that the lighting device is a member of the device group.

8. A method for configuring a lighting control system of a building environment, the method comprising:
   detecting an activation of a configuration mode of the lighting control system at a user interface of a control device;
   receiving wirelessly, at a lighting device, a message indicating that the activation of the configuration mode has been detected by the control device;
   receiving wirelessly, at the lighting device, a directional signal from a directional device subsequent to receiving the message; and
   changing a membership status of the lighting device in a device group in response to receiving the directional signal; and
   controlling remotely, at the control device, the lighting device in response to detecting a command input at the user interface of the control device.

9. The method as described in claim 8, wherein controlling remotely the lighting device includes controlling a light level of the lighting device.

10. The method as described in claim 8, wherein receiving wirelessly the message includes receiving wirelessly the message via radio wave-based technology at the lighting device.

11. The method as described in claim 8, wherein receiving wirelessly the directional signal includes receiving wirelessly the directional signal via light-based technology at the lighting device.

12. The method as described in claim 11, wherein the directional signal is an amplified or oscillated light signal directed toward the lighting device.

13. The method as described in claim 8, wherein changing the membership status of the lighting device in the device group includes adding the lighting device to the device group in response to determining that the lighting device is not a member of the device group.

14. The method as described in claim 8, wherein changing the membership status of the lighting device in the device group includes removing the lighting device from the device group in response to determining that the lighting device is a member of the device group.

15. A lighting device for configuring a lighting control system of a building environment comprising:
   a communication component configured to receive wirelessly a message indicating that an activation of a configuration mode has been detected by a first remote device;
   a sensor component configured to receive wirelessly a directional signal from a second remote device subsequent to receiving the message; and
   a controller configured to change a membership status of the lighting device in a device group in response to receiving the directional signal.

16. The lighting device described by claim 15, wherein the first remote device is a switch configured to control remotely a light level of the lighting device.

17. The lighting device described by claim 15, wherein the directional signal is an amplified or oscillated light signal directed toward the lighting device.

18. The lighting device described by claim 15, wherein the lighting device comprises a sensor communicating with a light fixture or a light fixture interface, wherein the sensor includes the communication component, the sensor component, and the controller.

19. The lighting device described by claim 15, wherein the controller adds the lighting device to the device group in response to determining that the lighting device is not a member of the device group.

20. The lighting device described by claim 15, wherein the controller removes the lighting device from the device group in response to determining that the lighting device is a member of the device group.

* * * * *